(12) United States Patent
Lefebvre et al.

(10) Patent No.: US 8,533,031 B2
(45) Date of Patent: *Sep. 10, 2013

(54) METHOD AND SYSTEM FOR RETAINING CUSTOMER LOYALTY

(75) Inventors: Christopher R. Lefebvre, Landenberg, PA (US); Christopher James Konen, Sr., Hockessin, DE (US); Matthew Joseph Keane, Medford, NJ (US); Elissa Budischak, Wilmington, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 66 days.

This patent is subject to a terminal disclaimer.

(21) Appl. No.: 12/884,313

(22) Filed: Sep. 17, 2010

(65) Prior Publication Data

US 2011/0022454 A1 Jan. 27, 2011

Related U.S. Application Data

(63) Continuation of application No. 09/688,694, filed on Oct. 17, 2000, now Pat. No. 7,831,467.

(51) Int. Cl.
*G06Q 30/00* (2012.01)

(52) U.S. Cl.
USPC .......................................................... 705/14.1

(58) Field of Classification Search
USPC ............................................................. 705/14
See application file for complete search history.

(56) References Cited

U.S. PATENT DOCUMENTS

| | | | |
|---|---|---|---|
| 1,245,531 A | 11/1917 | Tinsley | |
| 2,152,079 A | 3/1939 | Mott | |
| 2,986,144 A | 5/1961 | Shepard | |
| 4,223,403 A | 9/1980 | Konheim et al. | |
| 4,254,474 A | 3/1981 | Cooper et al. | |
| 4,319,336 A | 3/1982 | Anderson et al. | |
| 4,355,372 A | 10/1982 | Goldberg et al. | |
| 4,396,985 A | 8/1983 | Ohara | |
| 4,567,359 A | 1/1986 | Lockwood | |

(Continued)

FOREIGN PATENT DOCUMENTS

| | | |
|---|---|---|
| EP | 0559313 | 6/1997 |
| WO | WO 01/11532 | 2/2001 |

OTHER PUBLICATIONS

Gasner, Steve. Forging a Link Between Retention and Profits. Apr. 1992. Credit Card Management. vol. 5. Issue 1. p. 84.*

(Continued)

*Primary Examiner* — Matthew L Hamilton
(74) *Attorney, Agent, or Firm* — Hunton & Williams LLP

(57) ABSTRACT

A system and method for providing incentives to customers where the incentives are tailored to the customer's needs and expectations while achieving profitability to the provider are presented. The present invention determines a set of incentives based on customer segmentation, card segmentation, call type as well as other factors. Upon receiving a request for termination or other request, the customer may be routed to an appropriate person, department, or group. Information regarding the account may be identified and retrieved and the customer may be verified. Based on customer payment history and other information, the customer segment may be identified. Incentives are then determined based on customer segmentation data, product information, and call type. These incentives are offered to the customer for approval. If the customer does not accept the incentive, other sales opportunities may be offered to the customer in an effort to retain customer loyalty.

24 Claims, 8 Drawing Sheets

(56) References Cited

U.S. PATENT DOCUMENTS

| | | |
|---|---|---|
| 4,605,820 A | 8/1986 | Campbell, Jr. |
| 4,641,239 A | 2/1987 | Takesako |
| 4,661,658 A | 4/1987 | Matyas |
| 4,713,760 A | 12/1987 | Yamada et al. |
| 4,723,212 A | 2/1988 | O'Brien et al. |
| 4,745,468 A | 5/1988 | Von Kohorn |
| 4,750,036 A | 6/1988 | Martinez |
| 4,750,119 A | 6/1988 | Robertson et al. |
| 4,752,676 A | 6/1988 | Leonard et al. |
| 4,760,604 A | 7/1988 | Cooper |
| 4,877,947 A | 10/1989 | Mori |
| 4,882,675 A | 11/1989 | Nichtberger et al. |
| 4,891,503 A | 1/1990 | Jewell |
| 4,897,811 A | 1/1990 | Scofield |
| 4,906,826 A | 3/1990 | Spencer |
| 4,908,761 A | 3/1990 | Tai |
| 4,910,672 A | 3/1990 | Off |
| 4,926,255 A | 5/1990 | Von Kohorn |
| 4,958,375 A | 9/1990 | Reilly |
| 4,972,504 A | 11/1990 | Daniel, Jr. |
| 4,992,940 A | 2/1991 | Dworkin |
| 4,999,617 A | 3/1991 | Uemura |
| 5,023,782 A | 6/1991 | Lutz et al. |
| 5,025,372 A | 6/1991 | Burton et al. |
| 5,041,972 A | 8/1991 | Frost |
| 5,047,614 A | 9/1991 | Bianco |
| 5,056,019 A | 10/1991 | Schultz et al. |
| 5,117,355 A | 5/1992 | McCarthy |
| 5,122,950 A | 6/1992 | Mee et al. |
| 5,128,752 A | 7/1992 | Von Kohorn |
| 5,173,589 A | 12/1992 | Diehl |
| 5,173,851 A | 12/1992 | Off et al. |
| 5,175,682 A | 12/1992 | Higashiyama |
| 5,201,010 A | 4/1993 | Gabriel et al. |
| 5,202,826 A | 4/1993 | McCarthy |
| 5,220,501 A | 6/1993 | Lawlor |
| 5,231,569 A | 7/1993 | Myatt et al. |
| 5,233,514 A | 8/1993 | Ayyoubi |
| 5,233,654 A | 8/1993 | Harvey et al. |
| 5,237,620 A | 8/1993 | Deaton |
| 5,249,044 A | 9/1993 | Von Kohorn |
| 5,250,789 A | 10/1993 | Johnsen |
| 5,253,066 A | 10/1993 | Vogel |
| 5,259,018 A | 11/1993 | Grimmett et al. |
| 5,260,778 A | 11/1993 | Kauffman |
| 5,262,860 A | 11/1993 | Fitzpatrick |
| 5,265,008 A | 11/1993 | Benton et al. |
| 5,278,751 A | 1/1994 | Adiano |
| 5,285,278 A | 2/1994 | Holman |
| 5,287,181 A | 2/1994 | Holman |
| 5,287,268 A | 2/1994 | McCarthy |
| 5,297,026 A | 3/1994 | Hoffman |
| 5,305,196 A | 4/1994 | Deaton et al. |
| 5,311,594 A | 5/1994 | Penzias |
| 5,327,508 A | 7/1994 | Deaton et al. |
| 5,331,544 A | 7/1994 | Zhang et al. |
| 5,343,239 A | 8/1994 | Lappington |
| 5,351,186 A | 9/1994 | Bullock |
| 5,380,991 A | 1/1995 | Valencia |
| 5,396,417 A | 3/1995 | Burks |
| RE34,915 E | 4/1995 | Nichtberger et al. |
| 5,428,684 A | 6/1995 | Akiyama et al. |
| 5,430,644 A | 7/1995 | Deaton et al. |
| 5,442,567 A | 8/1995 | Small |
| 5,444,844 A | 8/1995 | Inoue |
| 5,448,471 A | 9/1995 | Deaton et al. |
| 5,475,743 A | 12/1995 | Nixon et al. |
| 5,483,444 A | 1/1996 | Heintzeman et al. |
| 5,488,423 A | 1/1996 | Walkingshaw |
| 5,488,571 A | 1/1996 | Jacobs |
| 5,490,060 A | 2/1996 | Malec |
| 5,491,838 A | 2/1996 | Takahisa |
| 5,500,514 A | 3/1996 | Veeneman et al. |
| 5,500,681 A | 3/1996 | Jones |
| 5,500,890 A | 3/1996 | Rogge et al. |
| 5,504,519 A | 4/1996 | Remillard |
| 5,508,731 A | 4/1996 | Kohorn |
| 5,513,102 A | 4/1996 | Auriemma |
| 5,513,117 A | 4/1996 | Small |
| 5,521,363 A | 5/1996 | Tannenbaum |
| 5,523,794 A | 6/1996 | Mankovitz |
| 5,537,314 A | 7/1996 | Kanter |
| 5,539,825 A | 7/1996 | Akiyama et al. |
| 5,550,734 A | 8/1996 | Tater |
| 5,551,021 A | 8/1996 | Harada |
| 5,559,313 A | 9/1996 | Claus et al. |
| 5,563,933 A | 10/1996 | August |
| 5,564,073 A | 10/1996 | Takahisa |
| 5,570,295 A | 10/1996 | Isenberg |
| 5,576,951 A | 11/1996 | Lockwood |
| 5,581,064 A | 12/1996 | Riley et al. |
| 5,594,493 A | 1/1997 | Nemirofsky |
| 5,603,025 A | 2/1997 | Tabb |
| 5,604,542 A | 2/1997 | Dedrick |
| 5,606,496 A | 2/1997 | D'Agostino |
| 5,612,868 A | 3/1997 | Off et al. |
| 5,621,812 A | 4/1997 | Deaton et al. |
| 5,634,101 A | 5/1997 | Blau |
| 5,638,457 A | 6/1997 | Deaton et al. |
| 5,640,587 A | 6/1997 | Davis et al. |
| 5,642,279 A | 6/1997 | Stone et al. |
| 5,642,485 A | 6/1997 | Deaton et al. |
| 5,644,723 A | 7/1997 | Deaton et al. |
| 5,649,114 A | 7/1997 | Deaton et al. |
| 5,652,602 A | 7/1997 | Fishman |
| 5,652,786 A | 7/1997 | Rogers |
| 5,659,469 A | 8/1997 | Deaton et al. |
| 5,664,115 A | 9/1997 | Fraser |
| 5,665,953 A | 9/1997 | Mazzamuto |
| 5,671,267 A | 9/1997 | August |
| 5,671,409 A | 9/1997 | Fatseas |
| 5,682,524 A | 10/1997 | Freund |
| 5,687,322 A | 11/1997 | Deaton et al. |
| 5,689,100 A | 11/1997 | Carrithers et al. |
| 5,704,044 A | 12/1997 | Tarter et al. |
| 5,710,886 A | 1/1998 | Christensen et al. |
| 5,710,889 A | 1/1998 | Clark et al. |
| 5,715,298 A | 2/1998 | Rogers |
| 5,715,402 A | 2/1998 | Popolo |
| 5,721,831 A | 2/1998 | Waits |
| 5,724,424 A | 3/1998 | Gifford |
| 5,727,163 A | 3/1998 | Bezos |
| 5,734,838 A | 3/1998 | Robinson et al. |
| 5,749,178 A | 5/1998 | Garmong |
| 5,758,328 A | 5/1998 | Giovannoli |
| 5,761,647 A | 6/1998 | Boushy |
| 5,761,661 A | 6/1998 | Coussenns |
| 5,765,142 A | 6/1998 | Allred et al. |
| 5,765,143 A | 6/1998 | Sheldon |
| 5,765,144 A | 6/1998 | Larche |
| 5,767,896 A | 6/1998 | Nemirofsky |
| 5,787,403 A | 7/1998 | Randle |
| 5,794,178 A | 8/1998 | Caid et al. |
| 5,794,207 A | 8/1998 | Walker |
| 5,796,395 A | 8/1998 | De Hond |
| 5,806,044 A | 9/1998 | Powell |
| 5,806,045 A | 9/1998 | Biorge |
| 5,815,127 A | 9/1998 | Jacobs |
| 5,819,092 A | 10/1998 | Ferguson |
| 5,819,285 A | 10/1998 | Damico |
| 5,822,410 A * | 10/1998 | McCausland et al. ... 379/114.01 |
| 5,832,457 A | 11/1998 | O'Brien |
| 5,835,087 A | 11/1998 | Herz |
| 5,842,178 A | 11/1998 | Giovannoli |
| 5,842,421 A | 12/1998 | Desilets et al. |
| 5,845,259 A | 12/1998 | West et al. |
| 5,852,811 A | 12/1998 | Atkins |
| 5,855,008 A | 12/1998 | Goldhaber et al. |
| 5,857,175 A | 1/1999 | Day |
| 5,861,906 A | 1/1999 | Dunn et al. |
| 5,862,223 A | 1/1999 | Walker |
| 5,870,456 A | 2/1999 | Rogers |
| 5,870,721 A | 2/1999 | Norris |
| 5,870,724 A | 2/1999 | Lawlor |

| Patent | Kind | Date | Name |
|---|---|---|---|
| 5,873,096 | A | 2/1999 | Lim |
| 5,884,278 | A | 3/1999 | Powell |
| 5,887,271 | A | 3/1999 | Powell |
| 5,890,135 | A | 3/1999 | Powell |
| 5,899,982 | A | 5/1999 | Randle |
| 5,918,214 | A | 6/1999 | Perkowski |
| 5,930,217 | A | 7/1999 | Kayanuma |
| 5,930,764 | A | 7/1999 | Melchione |
| 5,933,812 | A | 8/1999 | Meyer et al. |
| 5,940,811 | A | 8/1999 | Norris |
| 5,940,815 | A | 8/1999 | Maeda et al. |
| 5,945,653 | A | 8/1999 | Walker et al. |
| 5,949,044 | A | 9/1999 | Walker et al. |
| 5,950,173 | A | 9/1999 | Perkowski |
| 5,964,839 | A | 10/1999 | Johnson et al. |
| 5,970,467 | A | 10/1999 | Alavi |
| 5,970,469 | A | 10/1999 | Scroggie et al. |
| 5,970,480 | A | 10/1999 | Kalina |
| 5,974,396 | A | 10/1999 | Anderson |
| 5,974,399 | A | 10/1999 | Giuliani et al. |
| 5,987,434 | A | 11/1999 | Libman |
| 5,991,376 | A * | 11/1999 | Hennessy et al. ......... 379/114.1 |
| 5,991,736 | A | 11/1999 | Ferguson et al. |
| 5,995,942 | A | 11/1999 | Smith et al. |
| 6,006,205 | A | 12/1999 | Loeb et al. |
| 6,009,239 | A | 12/1999 | Morita et al. |
| 6,009,411 | A | 12/1999 | Kepecs |
| 6,009,415 | A | 12/1999 | Shurling et al. |
| 6,012,049 | A | 1/2000 | Kawan |
| 6,014,634 | A | 1/2000 | Scroggie et al. |
| 6,014,645 | A | 1/2000 | Cunningham |
| 6,014,647 | A | 1/2000 | Nizzari et al. |
| 6,018,718 | A | 1/2000 | Walker et al. |
| 6,026,370 | A | 2/2000 | Jermyn |
| 6,029,139 | A | 2/2000 | Cunningham et al. |
| 6,029,153 | A | 2/2000 | Bauchner et al. |
| 6,029,195 | A | 2/2000 | Herz |
| 6,032,125 | A | 2/2000 | Ando |
| 6,032,136 | A | 2/2000 | Brake, Jr. et al. |
| 6,055,510 | A | 4/2000 | Henrick |
| 6,055,513 | A | 4/2000 | Katz et al. |
| 6,061,658 | A | 5/2000 | Chou et al. |
| 6,061,660 | A | 5/2000 | Eggleston et al. |
| 6,070,147 | A | 5/2000 | Harms et al. |
| 6,073,105 | A | 6/2000 | Sutcliffe et al. |
| 6,076,072 | A | 6/2000 | Libman |
| 6,078,891 | A | 6/2000 | Riordan et al. |
| 6,078,892 | A | 6/2000 | Anderson et al. |
| 6,105,007 | A | 8/2000 | Norris |
| 6,108,642 | A | 8/2000 | Findley |
| 6,119,933 | A | 9/2000 | Wong et al. |
| 6,128,599 | A | 10/2000 | Walker et al. |
| 6,133,914 | A | 10/2000 | Rogers et al. |
| 6,134,532 | A | 10/2000 | Lazarus et al. |
| 6,141,666 | A | 10/2000 | Tobin |
| 6,161,128 | A | 12/2000 | Smyk |
| 6,169,974 | B1 | 1/2001 | Baumgartner et al. |
| 6,178,408 | B1 | 1/2001 | Copple et al. |
| 6,182,059 | B1 | 1/2001 | Angotti et al. |
| 6,185,541 | B1 | 2/2001 | Scroggie et al. |
| 6,189,787 | B1 | 2/2001 | Dorf |
| 6,195,644 | B1 | 2/2001 | Bowie |
| 6,216,129 | B1 | 4/2001 | Eldering |
| 6,222,914 | B1 | 4/2001 | McMullin |
| 6,236,978 | B1 | 5/2001 | Tuzhilin |
| 6,243,688 | B1 | 6/2001 | Kalina |
| 6,243,689 | B1 | 6/2001 | Norton |
| 6,267,292 | B1 | 7/2001 | Walker et al. |
| 6,278,996 | B1 | 8/2001 | Richardson et al. |
| 6,282,516 | B1 | 8/2001 | Giuliani |
| 6,289,324 | B1 | 9/2001 | Kawan |
| 6,292,786 | B1 | 9/2001 | Deaton et al. |
| 6,298,348 | B1 | 10/2001 | Eldering |
| 6,301,471 | B1 * | 10/2001 | Dahm et al. ................. 455/405 |
| 6,324,524 | B1 | 11/2001 | Lent et al. |
| 6,327,573 | B1 | 12/2001 | Walker et al. |
| 6,327,574 | B1 | 12/2001 | Kramer et al. |
| 6,330,543 | B1 | 12/2001 | Kepecs |
| 6,332,126 | B1 | 12/2001 | Peirce et al. |
| 6,334,108 | B1 | 12/2001 | Deaton et al. |
| 6,334,131 | B2 | 12/2001 | Chakrabarti et al. |
| 6,344,108 | B1 | 2/2002 | Von Medvey et al. |
| 6,349,290 | B1 | 2/2002 | Horowitz et al. |
| 6,351,735 | B1 | 2/2002 | Deaton et al. |
| 6,356,881 | B1 | 3/2002 | Milch et al. |
| 6,360,209 | B1 | 3/2002 | Loeb et al. |
| 6,377,935 | B1 | 4/2002 | Deaton et al. |
| 6,377,936 | B1 | 4/2002 | Henrick et al. |
| 6,404,866 | B1 | 6/2002 | Hopper et al. |
| 6,405,175 | B1 | 6/2002 | Ng |
| 6,405,181 | B2 | 6/2002 | Lent et al. |
| 6,409,080 | B2 | 6/2002 | Kawagishi |
| 6,411,947 | B1 | 6/2002 | Rice et al. |
| 6,424,947 | B1 | 7/2002 | Tsuria et al. |
| 6,424,949 | B1 | 7/2002 | Deaton et al. |
| 6,424,951 | B1 | 7/2002 | Shurling et al. |
| 6,430,539 | B1 | 8/2002 | Lazarus et al. |
| 6,434,534 | B1 | 8/2002 | Walker et al. |
| 6,473,740 | B2 | 10/2002 | Cockrill et al. |
| 6,476,830 | B1 | 11/2002 | Farmer et al. |
| 6,484,146 | B2 | 11/2002 | Day et al. |
| 6,487,539 | B1 | 11/2002 | Aggarwal et al. |
| 6,505,168 | B1 | 1/2003 | Rothman et al. |
| 6,513,019 | B2 | 1/2003 | Lewis |
| 6,516,302 | B1 | 2/2003 | Deaton et al. |
| 6,519,572 | B1 | 2/2003 | Riordan et al. |
| 6,535,855 | B1 | 3/2003 | Cahill et al. |
| 6,564,189 | B1 | 5/2003 | Nycz |
| 6,567,791 | B2 | 5/2003 | Lent et al. |
| 6,571,216 | B1 | 5/2003 | Garg et al. |
| 6,578,012 | B1 | 6/2003 | Storey |
| 6,587,835 | B1 | 7/2003 | Treyz et al. |
| 6,594,640 | B1 | 7/2003 | Postrel |
| 6,609,104 | B1 | 8/2003 | Deaton et al. |
| 6,611,811 | B1 | 8/2003 | Deaton et al. |
| 6,611,819 | B1 | 8/2003 | Oneda |
| 6,647,376 | B1 | 11/2003 | Farrar et al. |
| 6,662,215 | B1 | 12/2003 | Moskowitz et al. |
| 6,684,195 | B1 | 1/2004 | Deaton et al. |
| 6,714,919 | B1 | 3/2004 | Findley |
| 6,718,313 | B1 | 4/2004 | Lent et al. |
| 6,721,743 | B1 | 4/2004 | Sakakibara |
| 6,735,778 | B2 | 5/2004 | Khoo et al. |
| 6,754,640 | B2 | 6/2004 | Bozeman |
| 6,795,809 | B2 | 9/2004 | O'Brien et al. |
| 6,795,812 | B1 | 9/2004 | Lent et al. |
| 6,804,786 | B1 | 10/2004 | Chamley et al. |
| 6,817,008 | B2 | 11/2004 | Leford et al. |
| 6,819,748 | B2 | 11/2004 | Weiss et al. |
| 6,820,061 | B2 | 11/2004 | Postrel |
| 6,829,586 | B2 | 12/2004 | Postrel |
| 6,842,739 | B2 | 1/2005 | Postrel |
| RE38,717 | E | 3/2005 | Bothwell |
| 6,865,547 | B1 | 3/2005 | Brake, Jr. et al. |
| 6,874,139 | B2 | 3/2005 | Krueger et al. |
| 6,885,994 | B1 | 4/2005 | Scroggie et al. |
| 6,886,046 | B2 | 4/2005 | Stutz et al. |
| 6,889,198 | B2 | 5/2005 | Kawan |
| 6,892,187 | B2 | 5/2005 | Phillips et al. |
| 6,901,375 | B2 | 5/2005 | Fernandez |
| 6,901,406 | B2 | 5/2005 | Nabe et al. |
| 6,915,271 | B1 | 7/2005 | Meyer et al. |
| 6,920,611 | B1 | 7/2005 | Spaeth et al. |
| 6,938,156 | B2 | 8/2005 | Wheeler et al. |
| RE38,801 | E | 9/2005 | Rogers |
| 6,945,453 | B1 | 9/2005 | Schwarz, Jr. |
| 6,947,898 | B2 | 9/2005 | Postrel |
| 6,950,940 | B2 | 9/2005 | Wheeler et al. |
| 6,963,857 | B1 | 11/2005 | Johnson |
| 6,970,830 | B1 | 11/2005 | Samra et al. |
| 6,985,879 | B2 | 1/2006 | Walker et al. |
| 6,996,572 | B1 | 2/2006 | Chakrabarti et al. |
| 6,999,938 | B1 | 2/2006 | Libman |
| 7,003,476 | B1 | 2/2006 | Samra et al. |
| 7,006,979 | B1 | 2/2006 | Samra et al. |
| 7,010,495 | B1 | 3/2006 | Samra et al. |
| 7,024,374 | B1 | 4/2006 | Day et al. |
| 7,072,864 | B2 | 7/2006 | Brake, Jr. et al. |

| | | |
|---|---|---|
| 7,090,138 B2 | 8/2006 | Rettenmyer et al. |
| 7,092,905 B2 | 8/2006 | Behrenbrinker et al. |
| 7,121,471 B2 | 10/2006 | Beenau et al. |
| 7,143,063 B2 | 11/2006 | Lent et al. |
| 7,155,402 B1 | 12/2006 | Dvorak |
| 7,249,097 B2 | 7/2007 | Hutchison et al. |
| 7,249,099 B2 | 7/2007 | Ling |
| 7,266,835 B2 | 9/2007 | Halbert |
| 7,313,802 B1 | 12/2007 | Tomsen |
| 7,315,826 B1 | 1/2008 | Guheen et al. |
| 7,333,948 B2 | 2/2008 | Bell et al. |
| 7,340,408 B1* | 3/2008 | Drew et al. .................. 705/7.33 |
| 7,349,866 B2 | 3/2008 | Schwarz, Jr. |
| 7,356,516 B2 | 4/2008 | Richey et al. |
| 7,467,096 B2 | 12/2008 | Antonucci et al. |
| 7,493,636 B2 | 2/2009 | Kitsukawa et al. |
| 7,523,385 B2 | 4/2009 | Nguyen et al. |
| 7,580,857 B2 | 8/2009 | VanFleet et al. |
| 7,587,363 B2 | 9/2009 | Cataline et al. |
| 7,613,629 B2 | 11/2009 | Antonucci et al. |
| 7,630,935 B2 | 12/2009 | Loeger et al. |
| 7,640,205 B2 | 12/2009 | Michelassi et al. |
| 7,644,102 B2 | 1/2010 | Gaussier et al. |
| 7,689,504 B2 | 3/2010 | Warren et al. |
| 7,707,111 B2 | 4/2010 | Brake, Jr. et al. |
| 7,729,925 B2 | 6/2010 | Maritzen et al. |
| 7,729,980 B2 | 6/2010 | Mittenzwei et al. |
| 2001/0014868 A1 | 8/2001 | Herz et al. |
| 2001/0023407 A1 | 9/2001 | Liyanearachchi et al. |
| 2001/0025253 A1 | 9/2001 | Heintz et al. |
| 2001/0029490 A1 | 10/2001 | Inamochi |
| 2001/0034651 A1 | 10/2001 | Marks et al. |
| 2001/0034663 A1 | 10/2001 | Teveler et al. |
| 2001/0034718 A1 | 10/2001 | Shaked et al. |
| 2001/0037243 A1 | 11/2001 | Rouston et al. |
| 2001/0037299 A1 | 11/2001 | Nichols et al. |
| 2001/0039511 A1 | 11/2001 | Duckworth et al. |
| 2001/0044764 A1 | 11/2001 | Arnold |
| 2001/0044772 A1* | 11/2001 | Allen et al. ...................... 705/38 |
| 2001/0047342 A1 | 11/2001 | Cuervo |
| 2001/0049628 A1 | 12/2001 | Icho |
| 2001/0054003 A1 | 12/2001 | Chien et al. |
| 2002/0002485 A1 | 1/2002 | O'Brien et al. |
| 2002/0002495 A1 | 1/2002 | Ullman |
| 2002/0004742 A1 | 1/2002 | Willcocks et al. |
| 2002/0007313 A1 | 1/2002 | Mai et al. |
| 2002/0010621 A1 | 1/2002 | Bell et al. |
| 2002/0011517 A1 | 1/2002 | Namekawa et al. |
| 2002/0013728 A1 | 1/2002 | Wilkman |
| 2002/0023051 A1 | 2/2002 | Kunzle et al. |
| 2002/0026365 A1 | 2/2002 | Natanzon |
| 2002/0026394 A1 | 2/2002 | Savage et al. |
| 2002/0029177 A1* | 3/2002 | Smisek ........................... 705/30 |
| 2002/0032622 A1 | 3/2002 | Petit et al. |
| 2002/0040344 A1 | 4/2002 | Preiser et al. |
| 2002/0042742 A1 | 4/2002 | Glover et al. |
| 2002/0042774 A1 | 4/2002 | Ortiz et al. |
| 2002/0046096 A1* | 4/2002 | Srinivasan et al. ............... 705/14 |
| 2002/0046110 A1 | 4/2002 | Gallagher |
| 2002/0046116 A1 | 4/2002 | Hohle et al. |
| 2002/0049605 A1 | 4/2002 | Hagi |
| 2002/0049626 A1 | 4/2002 | Mathias et al. |
| 2002/0052778 A1 | 5/2002 | Murphy et al. |
| 2002/0052782 A1 | 5/2002 | Landesmann |
| 2002/0052852 A1 | 5/2002 | Bozeman |
| 2002/0055874 A1 | 5/2002 | Cohen |
| 2002/0059103 A1 | 5/2002 | Anderson et al. |
| 2002/0062253 A1 | 5/2002 | Dosh et al. |
| 2002/0062257 A1 | 5/2002 | Minamishin et al. |
| 2002/0065735 A1 | 5/2002 | Hatakama et al. |
| 2002/0069104 A1 | 6/2002 | Beach et al. |
| 2002/0069109 A1 | 6/2002 | Wendkos |
| 2002/0069158 A1 | 6/2002 | Larkin et al. |
| 2002/0070270 A1 | 6/2002 | Narita et al. |
| 2002/0072931 A1 | 6/2002 | Card |
| 2002/0072974 A1 | 6/2002 | Pugliese et al. |
| 2002/0073019 A1 | 6/2002 | Deaton |
| 2002/0077890 A1 | 6/2002 | LaPointe et al. |
| 2002/0077895 A1 | 6/2002 | Howell |
| 2002/0077904 A1 | 6/2002 | Ali |
| 2002/0077966 A1 | 6/2002 | Harycki et al. |
| 2002/0082920 A1 | 6/2002 | Austin et al. |
| 2002/0082962 A1 | 6/2002 | Farris et al. |
| 2002/0087349 A1 | 7/2002 | Wong |
| 2002/0091567 A1 | 7/2002 | Royston |
| 2002/0099601 A1 | 7/2002 | Farrell |
| 2002/0099649 A1 | 7/2002 | Lee et al. |
| 2002/0107731 A1 | 8/2002 | Teng |
| 2002/0111859 A1 | 8/2002 | Sheldon et al. |
| 2002/0111860 A1 | 8/2002 | Jones |
| 2002/0111861 A1 | 8/2002 | Sakamoto et al. |
| 2002/0111891 A1 | 8/2002 | Hoffman et al. |
| 2002/0116266 A1 | 8/2002 | Marshall |
| 2002/0116331 A1 | 8/2002 | Cataline et al. |
| 2002/0120497 A1 | 8/2002 | King |
| 2002/0120571 A1 | 8/2002 | Maung et al. |
| 2002/0120846 A1 | 8/2002 | Stewart et al. |
| 2002/0123926 A1 | 9/2002 | Bushold et al. |
| 2002/0123946 A1 | 9/2002 | Haworth et al. |
| 2002/0123955 A1 | 9/2002 | Andreski et al. |
| 2002/0128916 A1 | 9/2002 | Beinecke |
| 2002/0133401 A1 | 9/2002 | Mount et al. |
| 2002/0143614 A1 | 10/2002 | MacLean et al. |
| 2002/0143621 A1 | 10/2002 | Donnelly et al. |
| 2002/0143626 A1 | 10/2002 | Voltmer et al. |
| 2002/0147633 A1 | 10/2002 | Rafizadeh |
| 2002/0147691 A1 | 10/2002 | Davis et al. |
| 2002/0152116 A1 | 10/2002 | Yan et al. |
| 2002/0152118 A1 | 10/2002 | Hadjigeorgis |
| 2002/0152123 A1 | 10/2002 | Giordano et al. |
| 2002/0152179 A1 | 10/2002 | Racov |
| 2002/0161630 A1 | 10/2002 | Kern et al. |
| 2002/0161641 A1 | 10/2002 | Quinlan et al. |
| 2002/0165808 A1 | 11/2002 | Zamsky et al. |
| 2002/0169671 A1 | 11/2002 | Junger |
| 2002/0174011 A1 | 11/2002 | Sanchez et al. |
| 2002/0178056 A1 | 11/2002 | Lim |
| 2002/0178112 A1 | 11/2002 | Goeller et al. |
| 2002/0188478 A1 | 12/2002 | Breeland et al. |
| 2002/0188509 A1 | 12/2002 | Ariff et al. |
| 2002/0188511 A1 | 12/2002 | Johnson et al. |
| 2002/0188565 A1 | 12/2002 | Nakamura et al. |
| 2002/0194071 A1 | 12/2002 | Yoshizaki et al. |
| 2002/0194119 A1 | 12/2002 | Wright et al. |
| 2002/0198803 A1 | 12/2002 | Rowe |
| 2002/0198807 A1 | 12/2002 | Kobayashi et al. |
| 2003/0004794 A1 | 1/2003 | Hamilton |
| 2003/0004803 A1 | 1/2003 | Glover et al. |
| 2003/0004809 A1 | 1/2003 | Palcic et al. |
| 2003/0005288 A1 | 1/2003 | Moskowitz et al. |
| 2003/0009374 A1 | 1/2003 | Moodie et al. |
| 2003/0009379 A1 | 1/2003 | Narasimhan et al. |
| 2003/0009393 A1 | 1/2003 | Norris |
| 2003/0018523 A1 | 1/2003 | Rappaport et al. |
| 2003/0018549 A1 | 1/2003 | Fei et al. |
| 2003/0020744 A1 | 1/2003 | Ellis et al. |
| 2003/0023492 A1 | 1/2003 | Riordan et al. |
| 2003/0023557 A1 | 1/2003 | Moore |
| 2003/0033252 A1 | 2/2003 | Buttridge et al. |
| 2003/0036952 A1 | 2/2003 | Panttaja et al. |
| 2003/0040964 A1 | 2/2003 | Lacek |
| 2003/0046173 A1 | 3/2003 | Benjier et al. |
| 2003/0048888 A1 | 3/2003 | Hopper et al. |
| 2003/0050831 A1 | 3/2003 | Klayh |
| 2003/0055783 A1 | 3/2003 | Cataline et al. |
| 2003/0061093 A1 | 3/2003 | Todd |
| 2003/0061097 A1 | 3/2003 | Walker et al. |
| 2003/0061098 A1 | 3/2003 | Meyer |
| 2003/0065618 A1 | 4/2003 | VanDeBoe, Jr. |
| 2003/0069808 A1 | 4/2003 | Cardno |
| 2003/0083933 A1 | 5/2003 | McAlear |
| 2003/0088460 A1 | 5/2003 | Riordan et al. |
| 2003/0088462 A1 | 5/2003 | Carrither et al. |
| 2003/0088470 A1 | 5/2003 | Cuervo |
| 2003/0097298 A1 | 5/2003 | Klimpl et al. |
| 2003/0101131 A1 | 5/2003 | Warren et al. |
| 2003/0101454 A1 | 5/2003 | Ozer et al. |
| 2003/0105688 A1 | 6/2003 | Brown et al. |

| | | | | | | |
|---|---|---|---|---|---|---|
| 2003/0105689 A1 | 6/2003 | Chandak et al. | | 2005/0033637 A1 | 2/2005 | Underwood |
| 2003/0115100 A1 | 6/2003 | Teicher | | 2005/0049965 A1 | 3/2005 | Jen |
| 2003/0120544 A1 | 6/2003 | Gritzbach et al. | | 2005/0055270 A1 | 3/2005 | Broe |
| 2003/0125969 A1 | 7/2003 | Kizer et al. | | 2005/0065877 A1 | 3/2005 | Cleary et al. |
| 2003/0126011 A1 | 7/2003 | Bryman et al. | | 2005/0071225 A1 | 3/2005 | Bortolin et al. |
| 2003/0131357 A1 | 7/2003 | Kim | | 2005/0071226 A1 | 3/2005 | Nguyen et al. |
| 2003/0144902 A1 | 7/2003 | Bowie | | 2005/0071227 A1 | 3/2005 | Hammad et al. |
| 2003/0149629 A1 | 8/2003 | Claridge et al. | | 2005/0075889 A1 | 4/2005 | Gomes et al. |
| 2003/0158776 A1 | 8/2003 | Landesmann | | 2005/0080672 A1 | 4/2005 | Courtion et al. |
| 2003/0158782 A1 | 8/2003 | Thomson et al. | | 2005/0086103 A1 | 4/2005 | Agura et al. |
| 2003/0158818 A1 | 8/2003 | George et al. | | 2005/0086166 A1 | 4/2005 | Monk et al. |
| 2003/0171992 A1 | 9/2003 | Blagg et al. | | 2005/0086167 A1 | 4/2005 | Brake, Jr. et al. |
| 2003/0182194 A1 | 9/2003 | Choey et al. | | 2005/0091104 A1 | 4/2005 | Abraham |
| 2003/0195805 A1 | 10/2003 | Storey | | 2005/0091138 A1 | 4/2005 | Awatsu |
| 2003/0200141 A1 | 10/2003 | Robison | | 2005/0096976 A1 | 5/2005 | Nelms |
| 2003/0200142 A1 | 10/2003 | Hicks et al. | | 2005/0097033 A1 | 5/2005 | Pretell et al. |
| 2003/0205617 A1 | 11/2003 | Allen et al. | | 2005/0102178 A1 | 5/2005 | Phillips et al. |
| 2003/0208323 A1 | 11/2003 | Hao et al. | | 2005/0108090 A1 | 5/2005 | Takeda et al. |
| 2003/0208400 A1 | 11/2003 | Kuo et al. | | 2005/0108102 A1 | 5/2005 | York |
| 2003/0208439 A1 | 11/2003 | Rast | | 2005/0108151 A1 | 5/2005 | York |
| 2003/0212630 A1 | 11/2003 | Kahr | | 2005/0119938 A1 | 6/2005 | Smith et al. |
| 2003/0216964 A1 | 11/2003 | MacLean et al. | | 2005/0125292 A1 | 6/2005 | Kassab et al. |
| 2003/0216965 A1 | 11/2003 | Libman | | 2005/0125295 A1 | 6/2005 | Tidwell et al. |
| 2003/0216967 A1 | 11/2003 | Williams | | 2005/0125296 A1 | 6/2005 | Tidwell et al. |
| 2003/0216998 A1 | 11/2003 | Chang et al. | | 2005/0125315 A1 | 6/2005 | Munoz et al. |
| 2003/0217003 A1 | 11/2003 | Weinflash et al. | | 2005/0125337 A1 | 6/2005 | Tidwell et al. |
| 2003/0220834 A1 | 11/2003 | Leung et al. | | 2005/0125338 A1 | 6/2005 | Tidwell et al. |
| 2003/0225618 A1 | 12/2003 | Hessburg et al. | | 2005/0125339 A1 | 6/2005 | Tidwell et al. |
| 2003/0225619 A1 | 12/2003 | Dokken et al. | | 2005/0125350 A1 | 6/2005 | Tidwell et al. |
| 2003/0225786 A1 | 12/2003 | Hall et al. | | 2005/0125351 A1 | 6/2005 | Tidwell et al. |
| 2003/0229590 A1 | 12/2003 | Byrne et al. | | 2005/0125360 A1 | 6/2005 | Tidwell et al. |
| 2003/0233255 A1 | 12/2003 | Dirienzo | | 2005/0131761 A1 | 6/2005 | Trika et al. |
| 2003/0233278 A1 | 12/2003 | Marshall | | 2005/0131792 A1 | 6/2005 | Rowe |
| 2003/0233339 A1 | 12/2003 | Downs | | 2005/0137982 A1 | 6/2005 | Michelassi et al. |
| 2003/0236704 A1 | 12/2003 | Antonucci | | 2005/0144071 A1 | 6/2005 | Monahan et al. |
| 2003/0236712 A1 | 12/2003 | Antonucci et al. | | 2005/0144074 A1 | 6/2005 | Fredregill et al. |
| 2004/0002916 A1 | 1/2004 | Timmerman et al. | | 2005/0144105 A1 | 6/2005 | Czyzewski |
| 2004/0006487 A1 | 1/2004 | Tari | | 2005/0144143 A1 | 6/2005 | Freiberg |
| 2004/0010447 A1 | 1/2004 | Asayama | | 2005/0149386 A1 | 7/2005 | Agura et al. |
| 2004/0010462 A1 | 1/2004 | Moon et al. | | 2005/0149393 A1 | 7/2005 | Leof |
| 2004/0015394 A1 | 1/2004 | Mok et al. | | 2005/0149440 A1 | 7/2005 | Michelassi et al. |
| 2004/0030626 A1 | 2/2004 | Libman | | 2005/0154664 A1 | 7/2005 | Guy et al. |
| 2004/0039588 A1 | 2/2004 | Libman | | 2005/0159986 A1 | 7/2005 | Breeland et al. |
| 2004/0039686 A1 | 2/2004 | Klebanoff | | 2005/0160003 A1 | 7/2005 | Berardi et al. |
| 2004/0039687 A1 | 2/2004 | Lent et al. | | 2005/0160051 A1 | 7/2005 | Johnson |
| 2004/0044606 A1 | 3/2004 | Buttridge et al. | | 2005/0167342 A1 | 8/2005 | Vullriede et al. |
| 2004/0064401 A1 | 4/2004 | Palaghita et al. | | 2005/0171839 A1 | 8/2005 | Corriere |
| 2004/0078324 A1 | 4/2004 | Lonnberg et al. | | 2005/0171842 A1 | 8/2005 | Tien et al. |
| 2004/0078328 A1 | 4/2004 | Talbert et al. | | 2005/0171901 A1 | 8/2005 | Rosenblatt et al. |
| 2004/0078332 A1 | 4/2004 | Ferguson et al. | | 2005/0177503 A1 | 8/2005 | Thomas |
| 2004/0107125 A1 | 6/2004 | Guheen et al. | | 2005/0177523 A1 | 8/2005 | Weiss et al. |
| 2004/0111363 A1 | 6/2004 | Trench et al. | | 2005/0182654 A1 | 8/2005 | Abolfathi et al. |
| 2004/0111371 A1 | 6/2004 | Friedman | | 2005/0182735 A1 | 8/2005 | Zager et al. |
| 2004/0128248 A1 | 7/2004 | Fujihara et al. | | 2005/0187820 A1 | 8/2005 | Mohan |
| 2004/0138991 A1 | 7/2004 | Song et al. | | 2005/0192862 A1 | 9/2005 | Modi |
| 2004/0143526 A1 | 7/2004 | Monasterio et al. | | 2005/0197904 A1 | 9/2005 | Baron et al. |
| 2004/0172358 A1 | 9/2004 | Lent et al. | | 2005/0199708 A1 | 9/2005 | Friedman |
| 2004/0177036 A1 | 9/2004 | Nutahara et al. | | 2005/0203824 A1 | 9/2005 | Freud et al. |
| 2004/0181441 A1 | 9/2004 | Fung et al. | | 2005/0203857 A1 | 9/2005 | Friedman |
| 2004/0186773 A1 | 9/2004 | George et al. | | 2005/0205666 A1 | 9/2005 | Ward et al. |
| 2004/0193540 A1 | 9/2004 | Brown et al. | | 2005/0209917 A1 | 9/2005 | Anderson et al. |
| 2004/0199406 A1 | 10/2004 | Owens et al. | | 2005/0216346 A1 | 9/2005 | Kusumoto et al. |
| 2004/0210498 A1 | 10/2004 | Freund | | 2005/0222906 A1 | 10/2005 | Chen |
| 2004/0210531 A1 | 10/2004 | Barron et al. | | 2005/0234769 A1 | 10/2005 | Jain et al. |
| 2004/0215507 A1 | 10/2004 | Levitt et al. | | 2005/0234773 A1 | 10/2005 | Hirst et al. |
| 2004/0236688 A1 | 11/2004 | Bozeman | | 2005/0234789 A1 | 10/2005 | Czyzewski et al. |
| 2004/0243468 A1 | 12/2004 | Cohagan et al. | | 2005/0240474 A1 | 10/2005 | Li |
| 2004/0243506 A1 | 12/2004 | Das | | 2005/0240477 A1 | 10/2005 | Friday et al. |
| 2004/0249689 A1 | 12/2004 | Naraki et al. | | 2005/0242179 A1 | 11/2005 | Warwick |
| 2004/0249710 A1 | 12/2004 | Smith et al. | | 2005/0246289 A1 | 11/2005 | Alexander et al. |
| 2004/0249712 A1 | 12/2004 | Brown et al. | | 2005/0246627 A1 | 11/2005 | Sayed |
| 2004/0249764 A1 | 12/2004 | Delitz et al. | | 2005/0251446 A1 | 11/2005 | Jiang et al. |
| 2005/0004839 A1 | 1/2005 | Bakker et al. | | 2005/0251470 A1 | 11/2005 | Sullivan |
| 2005/0004864 A1 | 1/2005 | Lent et al. | | 2005/0256794 A1 | 11/2005 | Colby |
| 2005/0006286 A1 | 1/2005 | Fery et al. | | 2005/0256802 A1 | 11/2005 | Ammermann et al. |
| 2005/0021363 A1 | 1/2005 | Stimson et al. | | 2005/0261916 A1 | 11/2005 | McCall et al. |
| 2005/0021405 A1 | 1/2005 | Agarwal | | 2005/0261995 A1 | 11/2005 | Phelan |
| 2005/0021457 A1 | 1/2005 | Johnson et al. | | 2005/0267800 A1 | 12/2005 | Tietzen et al. |
| 2005/0023346 A1 | 2/2005 | Bakker et al. | | 2005/0273386 A1 | 12/2005 | Weidner |

| | | |
|---|---|---|
| 2005/0273387 A1 | 12/2005 | Previdi |
| 2005/0273425 A1 | 12/2005 | Yamazaki |
| 2005/0278215 A1 | 12/2005 | Seele, Jr. |
| 2005/0283429 A1 | 12/2005 | Bates et al. |
| 2005/0288998 A1 | 12/2005 | Verma et al. |
| 2005/0289003 A1 | 12/2005 | Thompson et al. |
| 2006/0004629 A1 | 1/2006 | Neemann et al. |
| 2006/0010033 A1 | 1/2006 | Thomas |
| 2006/0010034 A1 | 1/2006 | Sparks |
| 2006/0011719 A1 | 1/2006 | Lehtonen et al. |
| 2006/0015463 A1 | 1/2006 | Gupta et al. |
| 2006/0020507 A1 | 1/2006 | Sagey |
| 2006/0026073 A1 | 2/2006 | Kenny et al. |
| 2006/0031718 A1 | 2/2006 | Thornhill et al. |
| 2006/0036553 A1 | 2/2006 | Gupta et al. |
| 2006/0064329 A1 | 3/2006 | Abolfathi et al. |
| 2006/0080230 A1 | 4/2006 | Freiberg |
| 2006/0080243 A1 | 4/2006 | Kemper et al. |
| 2006/0080254 A1 | 4/2006 | Chigira et al. |
| 2006/0095350 A1 | 5/2006 | Hall et al. |
| 2006/0136306 A1 | 6/2006 | Rothman et al. |
| 2006/0143077 A1 | 6/2006 | Prorock |
| 2006/0143117 A1 | 6/2006 | Chigira et al. |
| 2006/0149671 A1 | 7/2006 | Nix et al. |
| 2007/0156521 A1 | 7/2007 | Yates |
| 2007/0186252 A1 | 8/2007 | Maggio |
| 2007/0260521 A1 | 11/2007 | Vander Riet |
| 2008/0184315 A1 | 7/2008 | Ellis et al. |
| 2009/0132347 A1 | 5/2009 | Anderson et al. |
| 2009/0150937 A1 | 6/2009 | Ellis et al. |

OTHER PUBLICATIONS

PCT—International Search Report dated Jan. 22, 2001 for Application Serial No. PCT/US01/32144.

Salesforce Automation/Customer Relationship Management, Computer Telephony Specialist, May 25, 1999.

Craig Stedman, Utilities, telcos seek marketing edge, Computer World, vol. 32, No. 16, pp. 20, Apr. 20, 1998.

Gasner, Steve, Forging a Link Between Retention and Profits. Apr. 1992. Credit Card Management. vol. 5. Issue 1. p. 84.

Ducote, et al., A Design of Personnel Scheduling Software for Manufacturing, Computers & Industrial Engineering, vol. 37, p. 473-476, 1999.

Ristad, A Natural Law of Succession, Research Report CS-TR-495-95, May 1995, Revised Jul. 1995, 1-24.

Kalman, A New Approach to Linear Filtering and Prediction Problems, Journal of Basic Engineering, 82 (Series D) 35-45, 1960.

White, A Reality Check for Data Snooping, Econometrica, vol. 68, No. 5, 1097-1126, Sep. 2000.

ABS-USA.com Web Pages, Atlass Business Solutions, Inc., Employee Software and HR Software Solutions, retrieved from the internet at http//web.archive.org/web/19991117171214/http//www.abs-usa.com/index.html, retrieved from the internet on Oct. 11, 2006.

Bell et al., An information-maximisation approach to blind separation and blind deconvolution, Neural Computation 7, 6, 1004-1034, 1995.

Cybenko, Approximation by Superpositions of a Sigmoidal Function, Oct. 24, 1988.

Michael Kasavana, Automated Labor Management, Restaurant Business, vol. 85, p. 162(2), Aug. 10, 1986.

Quinlan, Bagging, Boosting, and C4.5, University of Sydney, Sydney, Australia 2006, quinlan@cs.su.oz.au.

Ceramic Industry, Behind the Scenes with Bruce Cowgill (2001).

Blue-Pumpkin.com Web Pages, How Does PrimeTime Work?, Blue Pumpkin Software, Jan. 1998, retrieved from Archive.org on Jun. 23, 2005.

Michael Kasavana, Computers and Multiunit Food-Service Operations, Cornell Hotel & Restaurant Administration Quarterly, vol. 35, No. 3, p. 72-80, Jun. 1994.

Chakrabarti, Data mining for hypertext A tutorial survey, SIGKDD Explorations, vol. 1, Issue 2, Jan. 2000, pp. 1-11.

Moody et al., Fast Learning in Networks of Locally-Tuned Processing Units, Neural Computation, 1989, pp. 281-294.

Sarkissian et al., From plastics to customers inferences based on mixture models, Sep. 2002, pp. 1-12.

GMTCorp.com Web Pages, Global Management Technologies, Inc., Feb. 2001, retrieved from Archive.org on Jan. 10, 2006.

High Tech Staff Scheduling for Banks, HR Banker, Mar. 1998, p. 9-11.

Deerwester et al., Indexing by Latent Semantic Analysis, pp. 1-30 (1990).

Buntine et al., Is Multinomial PCA Multi-faceted Clustering or Dimesionality Reduction?, Proceedings of the Ninth International Workshop on Artificial Intelligence and Statistics, 2003, pp. 300-307.

Kiran.com Web Pages—eStaff Now, Kiran Consulting Group, Mar. 2000, Oct. 2000, retrieved from Archive.org, Jan. 10, 2006.

Kronos Smart Scheduler Product Brochure, Kronos, Inc., 1999, retrieved from Archive.org, Jan. 10, 2006.

Kronos.com—Workforce Smart Scheduler, Kronos, Inc., Apr. 2000-Jan. 2001, retrieved from Archive.org, Jan. 10, 2006.

Thomphson, Labor Scheduling Part 1—Forecasting Demand, Cornell Hotel & Restaurant Administration Quarterly, vol. 39, No. 5, Oct. 1998, p. 22-31.

Thomphson, Labor Scheduling Part 2—Knowing how many on-duty employees to schedule, vol. 39, No. 6, Dec. 1998, p. 26-37.

Thomphson, Labor Scheduling Part 3—Developing a Workforce Schedule, Cornell Hotel & Restaurant Administration Quarterly, vol. 40, No. 1, Feb. 1999, p. 86-96.

Thomphson, Labor Scheduling Part 4—Controlling Workforce Schedules in Real Time, Cornell Hotel & Restaurant Administration Quarterly, vol. 40, No. 3, Jun. 1999, p. 85-96.

Berry, Large Scale Sparse Singular Value Computations, Department of Computer Science, pp. 1-51.

Bottou et al., Local Learning Algorithms, Neural Computation, 1992, pp. 888-900.

McLachlan et al., ML Fitting of Mixture Models, pp. 39-54 (2005).

Baeza-Yates et al., Modern Information Retrieval, pp. 123-138 (1999).

Bishop, Neural Networks for Pattern Recognition, Department of Computer Science and Applied Mathematics, Oxford University Press, 1995.

Pipkins.com Web Pages—Maxima Advantage, Pipkins, May 1998, retrieved from Archive.org on Oct. 10, 2006.

Pipkins.com Web Pages, Workforce Management for Call Centers, Pipkins, Inc., Nov. 1999, retrieved from Archive.org on Oct. 10, 2006.

Sarle, Prediction with Missing Inputs, SAS Institute Inc., Sep. 7, 1998.

Cadez et al., Predictive Profiles for Transaction Data using Finite Mixture Models, Technical Report No. 01-67 (2001).

Savitch, Problem Solving with C++ The Object of Programming, Addison Wesley, 3rd edition, 1999.

Computer Telephony Specialists, Salesforce Automation/Customer Relationship Management, Computer Telephony, May 25, 1999.

Dowla et al., Seismic Discrimination With Artificial Neural Networks Preliminary Results With Regional Spectral Data, Bulletin of the Seismological Society of America, vol. 80, No. 5, Oct. 1990, pp. 1346-1373.

John Shawe-Taylor and Nello Christianini, Shawe-Taylor et al., Support Vector Machines, Suppor Vector Machines and Other Kernel-Based Learning Methods, Chapter 6, pp. 93-122, Cambridge University Press, 2000.

Duff et al., Sparse matrices storage schemes and simple operations, Direct Methods for Sparse Matrices (1998).

Thomas Severino, Staff Control for Banks A Further Analysis, The Magazine of Bank Administration, vol. 60, No. 6, Jun. 1984.

Hofmann et al., Statistical Models for Co-occurrence Data, , Massachusetts Institute of Technology, Artifical Intelligence Laboratory, A. I. Memo No. 1625, C.B.C.L. Memo No. 159, Feb. 1998.

Gasner, Steve Gasner, Forging a Link between Retention and Profits, Credit Card Management, vol. 5, Iss. 1, Apr. 1992, 4 pgs.

Raynor, William J.,, The International Dictionary of Artificial Intelligence 1999.

Park et al., Universal Approximation Using Radial-Basis-Function Networks, Neural Computation, 1991, pp. 246-257.

Berry et al., Using Linear Algebra for Intelligent Information Retrieval, Computer Science Department, CS-94-270, Dec. 1994.

Stedman, Utilities, telcos seek marketing edge, Computer World, V32n16., ISSN 0010-4841, Apr. 20, 1998, p. 20.

* cited by examiner

METHOD AND SYSTEM FOR RETAINING CUSTOMER LOYALTY

RELATED APPLICATIONS

This patent application is a continuation of U.S. patent application Ser. No. 09/688,694 filed Oct. 17, 2000 now U.S. Pat. No. 7,831,467, which is hereby incorporated by reference herein by its entirety.

FIELD OF THE INVENTION

The invention relates to a system and method for retaining customer loyalty by presenting incentives that are tailored to a particular customer and profitable to the provider. More particularly, the invention relates to a system and method that presents incentives and sales opportunities based on customer segmentation, product segmentation, call type and other criteria for the purpose of retaining customer loyalty.

BACKGROUND OF THE INVENTION

Traditionally, service and product providers, including banks and other financial institutions, have attempted to retain all customers at whatever the costs. Without regard to the customer's characteristics and profitability to the provider, service and product providers have made efforts to retain even the most delinquent customers. In most instances, the same offer is presented to all customers. This type of retention effort often results in lower profitability to the provider.

Currently, there are many different types of banking related products and services offered to customers. Different individuals are attracted to different products and have varying needs and expectations. For example, a single college student may acquire a credit card for emergency purposes and regular school expenses. The student's parents may even pay the bill for the student. On the other hand, a parent of four children may have several credit cards, a mortgage, loans, retirement funds, and several college funds. Without knowledge of the customer's spending habits and demographics, it becomes more difficult to present incentives that effectively retain customers.

Due to changing circumstances, customer need, and fierce competition among other providers, there may be a high rate of termination in response to more attractive incentives offered by competitors. If a current provider is not adequately meeting the needs of its customers, the customer may build associations elsewhere when confronted with an attractive incentive or offer. In other instances, a customer may initiate termination due to dissatisfied service and lack of customer satisfaction. Generally, it is beneficial for the provider to retain current customers for the purpose of building recognition and loyalty. Also, long-term customer loyalty establishes a strong presence in the industry as well as a prominent reputation. However, in other instances, when a customer becomes unacceptably delinquent in payments or otherwise unprofitable, it may be economically detrimental for the provider to maintain relations with this customer. Thus, efforts to retain customers are partially motivated by the customer's behavior and attributes.

When a provider is confronted with a request to terminate, the provider may present numerous types of offers or promotions in an effort to retain that customer. However, without becoming familiar with a customer's buying habits or attributes, presentment of offers may not be well received by the customer. An incentive presented by the provider may be attractive to one group of customers while another group of customers may have little or no interest in the presented incentive. Also, different types of products may yield different needs and expectations from customers. Further, based on the type of call and the customer's objectives, a customer may be more or less willing to continue association with a particular provider.

Therefore, the chances of retaining a customer in response to a request to terminate are significantly lower when customer related factors are not readily available or properly segmented. Other problems and drawbacks exist with current systems.

SUMMARY OF THE INVENTION

An object of the invention is to overcome the aforementioned and other drawbacks.

Another object of the invention is to provide a system and method for retaining customer loyalty.

Another object of the invention is to provide a system and method for presenting incentives to customers based on customer characteristics.

Another object of the invention is to provide a system and method for presenting incentives to customers based on the customer's product (e.g., card) characteristics.

Another object of the invention is to provide a system and method for presenting incentives to customers based on the customer's call type.

Another object of the invention is to provide a system and method for presenting incentives to customers based on customer characteristics, product characteristics, and call type.

To achieve these and other objects, and in accordance with the purpose of the invention, as embodied and broadly described, an embodiment of the invention comprises a system and method for retaining customer loyalty. The present invention presents incentives to customers where the incentives are tailored to the customer's needs and expectations while maintaining profitability for the provider. The present invention determines a set of incentives based on customer segmentation, card segmentation, call type as well as other factors.

Additional features and advantages of the invention will be set forth in the description that follows, and in part will be apparent from the description, or may be learned by practice of the invention. The objectives and other advantages of the invention will be realized and attained by the system and methods, particularly pointed out in the written description and claims hereof, as well as the appended drawings.

DETAILED DESCRIPTION OF THE INVENTION

The invention is directed to a system and method for retaining customer loyalty. According to an embodiment, the invention may be utilized by a financial institution. A system and method for providing incentives to customers where the incentives are tailored to the customer's needs and expectations while achieving profitability to the provider are presented. The present invention determines a set of incentives based on customer segmentation, card segmentation, and call type, as well as other factors.

Figure 1:
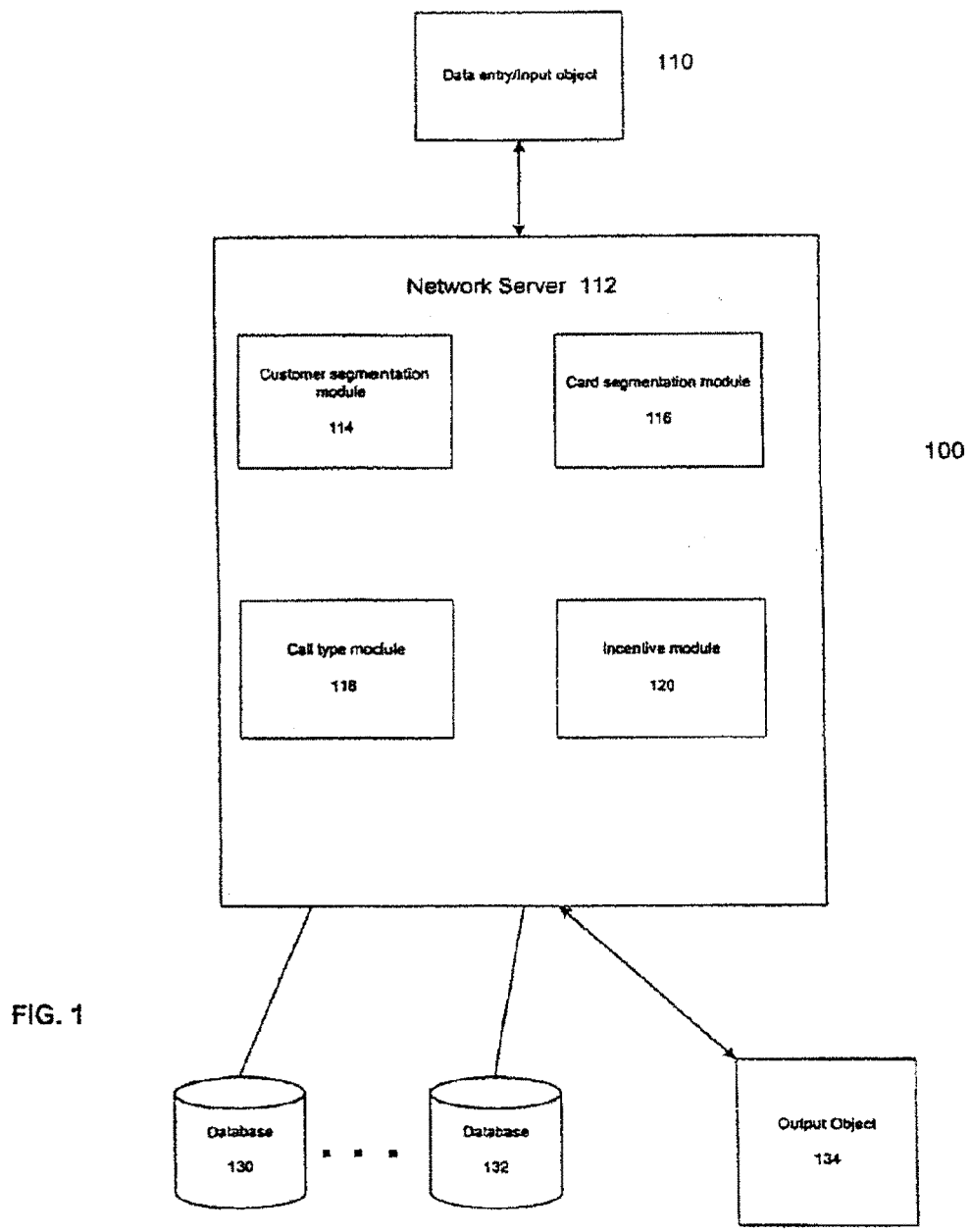
FIG. 1 is a block diagram of a system in accordance with an embodiment of the present invention.

According to an embodiment, the system and method of the present invention may be accomplished by a system shown in FIG. 1. Referring to FIG. 1, system 100 may include Data Input Object 110, Databases 130 and 132, Network Server 112 and Output Object 134. Data Input Object 110 operates to receive input from a variety of sources. Data Input Object 110 may encompass any device capable of inputting and receiving data, such as, but not limited to, input by way of a keyboard, keypad, coding mechanism, voice recognition, or any other electronic method. Data Input Object 110 may include a keyboard or mouse operatively connected to a computer terminal with a display, where the computer functions as part of a client-server computer network.

Data received by Data Input Object 110 is relayed to Network Server 112 which may store, compile and process various system modules and data. As shown in FIG. 1, according to an embodiment of the present invention, Network Server 112 may include Customer Segmentation Module 114, Card Segmentation Module 116, Call Type Module 118, and Incentive Module 120. Other modules and functions may also be included. Notably, this architecture is exemplary only and the system of the present invention may be implemented in a variety of different computer network types. For example, Customer Segmentation Module 114, Card Segmentation Module 116, Call Type Module 118, Incentive Module 120 may reside on a stand alone computer which itself is operatively connected to Databases 130 and 132 and other system components shown and not shown. Also, for example, the system and method may be operated in an Internet-related environment where many or all of the system components discussed herein reside on or may be accessed by the way of the Internet.

Network Server 112 may interact with Databases 130, 132, Output Object 134 and other components comprising or connected to the system, such as other servers and data terminals within the system, or other computer or telecommunications networks including the Internet. Databases 130 and 132 may store data for the operation of the system. These databases may comprise any medium capable of storing electronic data, including, but not limited to, databases, RAM, cache, CD or magnetic disk, or any combination thereof. According to an embodiment of the present invention, system 100 may encompass a number of storing object databases which interact and exchange information and data with Network Server 112. For example, Database 130 may store information related to accounts and Database 132 may store information related to incentives, such as history, summary and availability information. Other databases may also be used to store other relevant information.

Output Object 134 may encompasses any device capable of outputting or transmitting data in any form. As such, Output Object 134 may include a printer, computer or computer display, modem, facsimile transmission or any other electronic or telecommunication device which performs a similar or related function. Notably, when Data Input Object 110 includes a display, it may also function as an output object.

Figure 2:
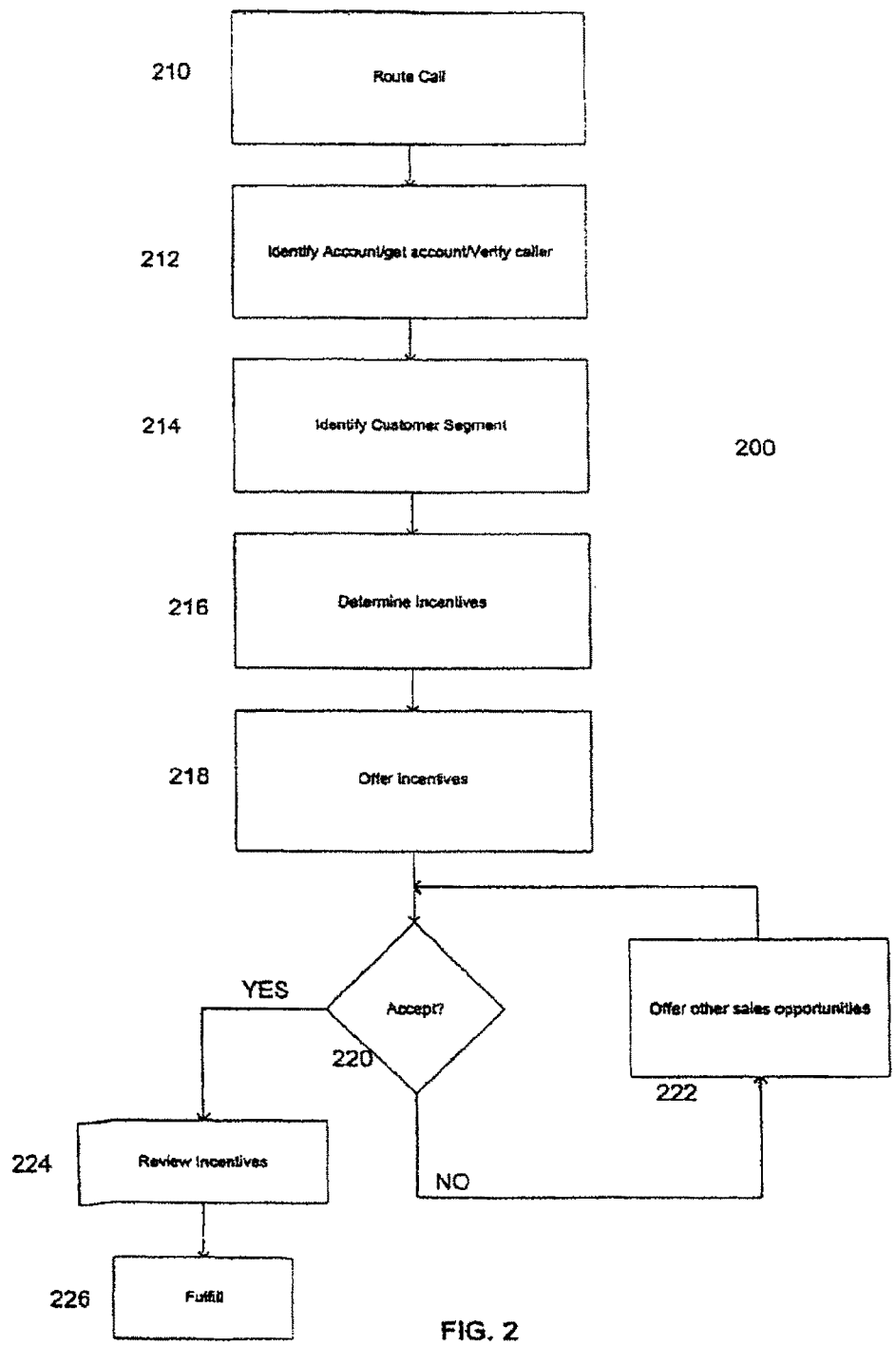
FIG. 2 is a flowchart for a retention request process in accordance with an embodiment of the invention.

FIG. 2 is an example of a flowchart for a retention request process 200 in accordance with an embodiment of the invention. A customer may initiate a communication with an entity, such as a financial institution, to terminate services or inquire about promotions/incentives or other services or products. The communication may be a telephone conversation, a correspondence over the Internet, or other form of communication. In other instances, a request for termination may arise in response to a financial institution's initiative. Upon receiving a request for termination or other request, the customer may be routed to an appropriate person, department, or group, at step 210. Information regarding the account may be identified and retrieved and the customer may be verified, at step 212. Based on customer characteristics and other information, the customer segment may be identified at step 214. Incentives are then determined based on various factors which may include customer segmentation, at step 216. The customer may be offered the incentives at step 218. If the offer is accepted, the incentives may then be reviewed with the customer, at step 224. The accepted one or more offers may be fulfilled, at step 226. However, if the customer does not accept the incentive, other sales opportunities may be offered to the customer, at step 222. This process may continue until the customer accepts an incentive or until either party exits. For example, the customer may find the incentives unacceptable. Also, the provider may find it unprofitable to further attempt to retain the customer.

Referring to step 210, a customer's call may be routed or directed to an appropriate group for customized assistance based on the customer's characteristics, the product or other factors. One group may handle customers based on the card status or other attributes. For example, if a card is identified as delinquent, a collections organization or group may address customers associated with these cards. Another group may handle customers associated with a particular product segment. For example, a card segment may be based on the type of card, such as an airline, military, business, or merchant card. To assist customers with language and other barriers, another group may specialize in a foreign language, such as Spanish, Chinese, etc. Other specialized groups may also be made available.

Figure 3:
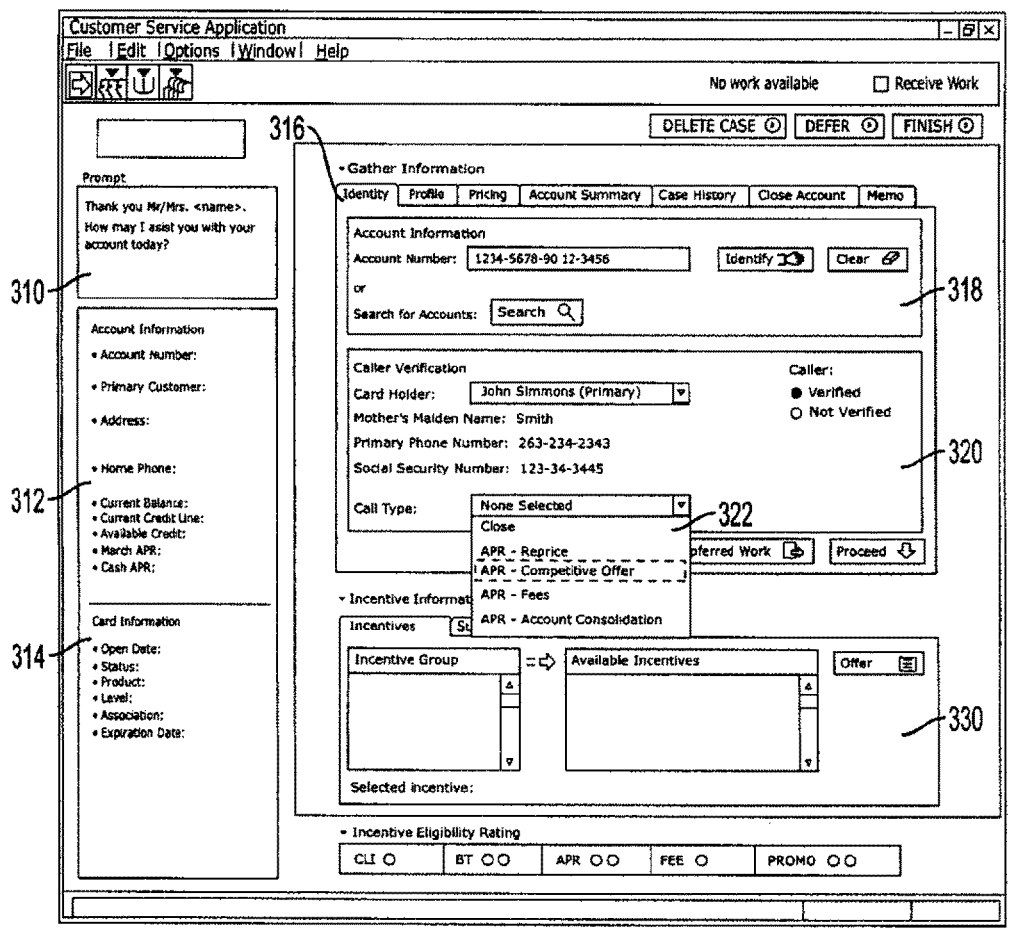
FIG. 3 illustrates an example of a GUI containing an identification feature in accordance with an embodiment of the invention.

Referring to step 212, account information may be identified, retrieved, and verified, as shown in FIG. 3. Account information may be displayed on a provider representative's computer screen as part of a graphical user interface (GUI). By selecting Identify Tab 316, an Account Information Box 318 and a Caller Verification Box 320 may be displayed. The customer may provide an account number or other identifier, which may be entered in Account Information Box 318. When an identify button is selected, the associated account information may be displayed in Caller Verification Box 320. By retrieving the account, additional account related information may also be obtained, such as pricing information, payment history, statements, fees and other information. Also, a different account may be used as the basis for the call, at the customer's request.

Figure 4:
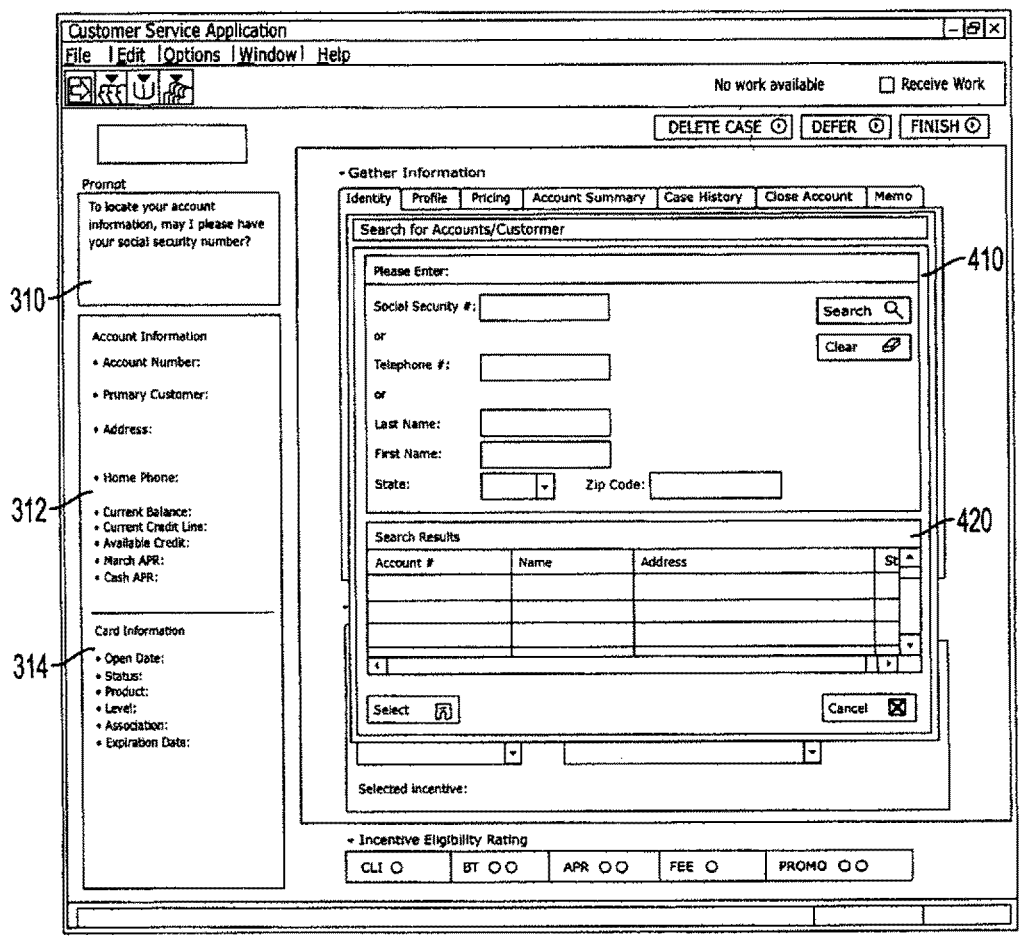
FIG. 4 illustrates an example of a GUI containing a search feature in accordance with an embodiment of the invention.

There may be instances where the customer is unable to supply the account number. The system may search for the account number or other identifier based on other personal information. FIG. 4 illustrates an example of a GUI displaying a search screen according to an embodiment of the present invention. For example, the customer may supply other identifiers, such as social security number, telephone number, last name, first name, and other personal information in the search for Account/Customer Box 410. Search results may display multiple accounts with the similar entries in Search Result Box 420. By scrolling down the list of possible entries, the correct account may be selected.

As shown in Caller Verification box 320 in FIG. 3, the customer may be verified for security purposes and other reasons. The caller may be identified as a primary, secondary, authorized user, third party, or other entity. Based on the role of the caller, certain limits or restrictions may apply with regards to the type of action that the caller may initiate. Caller verification may be established by confirming the mother's maiden name of the primary account holder or through other verification means, such as a unique answer to specific question. The caller may also be asked to verify the primary phone number, social security number or other personal information.

After account information is retrieved, displayed and verified, the provider representative may engage the customer in a discussion to ascertain information that may be relevant in determining the most profitable and attractive incentives to the customer. Prompt box 310 may provide guidance to the provider representative in eliciting pertinent information. Based on the relevant information, the provider representative may classify the customer's situation according to a plurality of predetermined call categories, or call types, as shown by Call Type drop down window 322. The call type that most accurately describes the caller's situation may be selected. This information, along with other customer information, is then used to determine a profitable and effective incentive that promotes customer loyalty. Call type selections 322 may include close; APR—Reprice; APR—Competitive Offer; APR—Fees; APR—Account Consolidation; and other call type selections. After the caller is properly identified, a list of possible incentives may be presented in Incentives box 330. When the caller is properly verified, the provider representative may begin offering incentives to the customer and perform other operations.

Referring to step 214, the customer may be categorized into a specific customer segment to ensure that the most optimal offers are presented to the customer. Customer segmentation may be based on characteristics of the customer, such as paying habits and payment history. Customer segmentation may involve assigning a numerical value to a customer. Other values may also be used such as symbols, letters, etc. This value may be based on various customer attributes, such as behavior segment value, credit bureau score, profit sight score, profitability score, attrition score, delinquency days and other factors.

Figure 5:
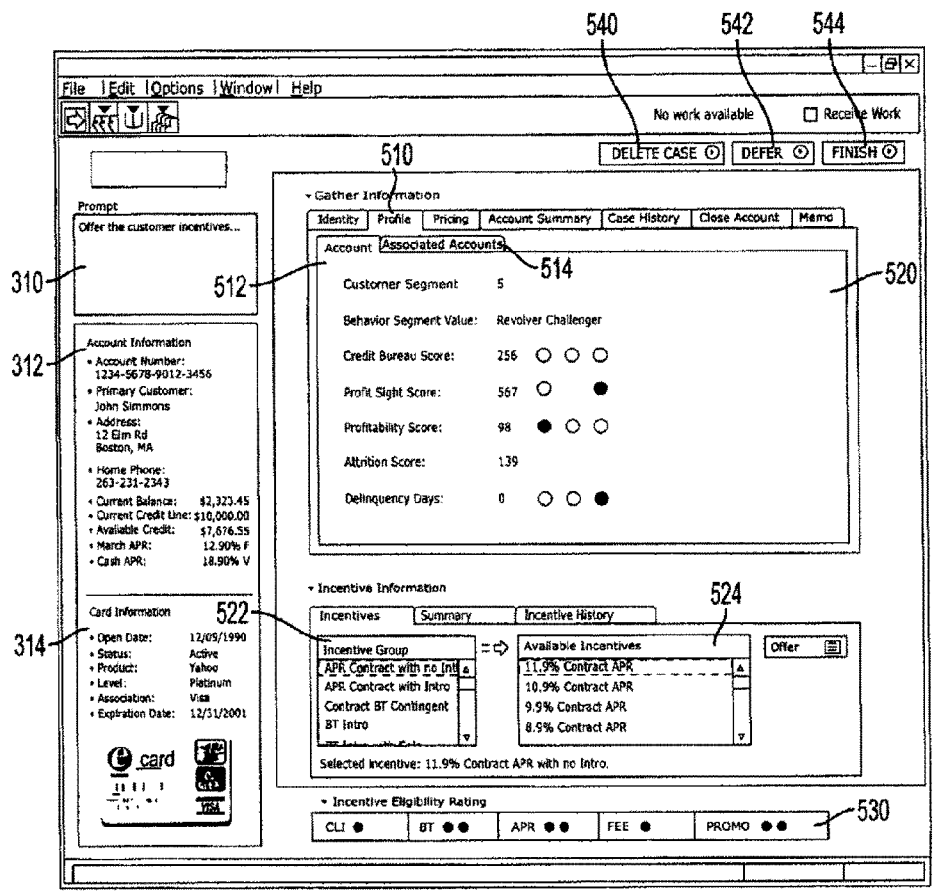
FIG. 5 illustrates an example of a GUI containing profile information in accordance with an embodiment of the invention.

FIG. 5 illustrates an example of a GUI displaying customer profile information according to an embodiment of the present invention. By selecting Profile Tab 510, profile details of the customer's accounts may be displayed. By selecting Account Tab 512, customer characteristic information for the current account may also be displayed. Other associated accounts under Tab 514 may also be accessed. In this example, the customer has been assigned a customer segment value of 5. This value is based on various customer attribute information. For instance, this customer has been assigned a behavior segment label of Revolver Challenger. Various scores may be provided for factors as well as color-coded indicators. For instance, this customer's Credit Bureau Score is 256 where a yellow caution circle may be assigned to warn the provider representative to proceed with caution. Similarly, this customer's profitability score may be assigned a red circle signifying that this customer is not a profitable customer. However, the profit sight score and delinquency days may be assigned a green circle which indicates that the customer has scored favorably in these areas. These factors indicate risk of flight, profitability and other characteristics that assist in determining which incentives to offer the customer. These factors further assist in determining whether any incentives are to be offered at all. Other visual aids may be employed. For instance, a wider range of colors may be used to provide a more graded set of indicators. Also, a single color change may be used to signify a clear approval or rejection.

Referring to step 216, incentives to be offered to the customer may be determined from an incentive matrix table or other method. At the appropriate time, the provider representative may be prompted by Prompt Box 310, as shown in FIG. 5. The incentive matrix may calculate an optimal set of incentives that may be used to retain the customer. Factors for consideration may include the customer segment, behavior segment value, credit bureau score, profitability score, attrition score, delinquency days and other considerations. Further, information related to the customer's product information may also be considered. This information may include customer demographics and card specific information. Also, the customer's call type may also provide insight into the customer's expectations and goals. These factors and other pertinent information may then be used to formulate an optimal set of incentives that may be offered to the customer for customer retention.

In addition, restrictions or other limitations may be placed on the list of possible incentives to preserve profitability to the provider. For example, after assessing the customer's segmentation and other factors, it may be less profitable to attempt to retain a customer who has been delinquent on several payments. The system may institute threshold factors to determine various grades of delinquency. For example, if another customer was delinquent on one payment by two days several months ago, there is a strong possibility that this customer may serve as a profitable customer. Also, incentive restrictions may be based on a caller's account role as primary, secondary, authorized user or third party.

As displayed in Incentives Group 522, possible incentives categories may include APR contract with no introductory; APR contract with introductory; balance transfers with introductory; balance transfers with introductory and goto; balance transfers with contract base; non automated fulfillment; balance transfer contingency; fee waivers (e.g., lifetime, partial or full waivers); credit line increase, balance transfer introductory extension and other incentives. Upon selecting an incentive group, available incentives within that group may be displayed and offered to the customer, as shown by Available Incentives 524. For example, when the incentive group directed to APR contract with no introductory is selected, available incentives may include specific percentages, such as 11.9% Contract APR, 10.9% Contract APR, 9.9% Contract APR, and 8.9% Contract APR. Other percentages and variations may also be offered to the customer, based on customer eligibility.

The customer's incentive eligibility rating may be displayed in Incentive Rating box 530. This indicates to the provider representative which groups of incentives are most profitable to the provider. For example, the incentive eligibility ratings may be displayed in a color-coded manner where red signifies a negative incentive and green signifies a favorable incentive. Other color schemes and symbols may also be used. In this example, the customer is more eligible for Balance Transfer, APR, and Promotional incentives, as indicated by two green circles. According to another embodiment of the present invention, incentives that the customer are not eligible for may be removed from the list of options. Eligibility may be based on profitability, risk of flight, and other factors.

Account Information box 312 may display the customer's account number and personal information, such as primary customer name, address, home phone number, and other information. Account information may include the current balance, current credit line, available credit, merchandise APR, cash APR and other account related information. Card Information box 314 may include an open date; status (e.g., active, inactive); product; level; association; expiration date; and other card related information. Card type may include the categories, such as merchants, services, etc. For example, card types may include Internet Service Providers; Airline affiliated cards; Merchants, such clothing stores, music stores, Universities and others. The type of card may indicate customer demographics and other attributes. At any time, the provider representative may delete the case, defer the action, or finish the offer by selecting the appropriate buttons 540, 542, and 544. Other operations may also be available.

Figure 6:
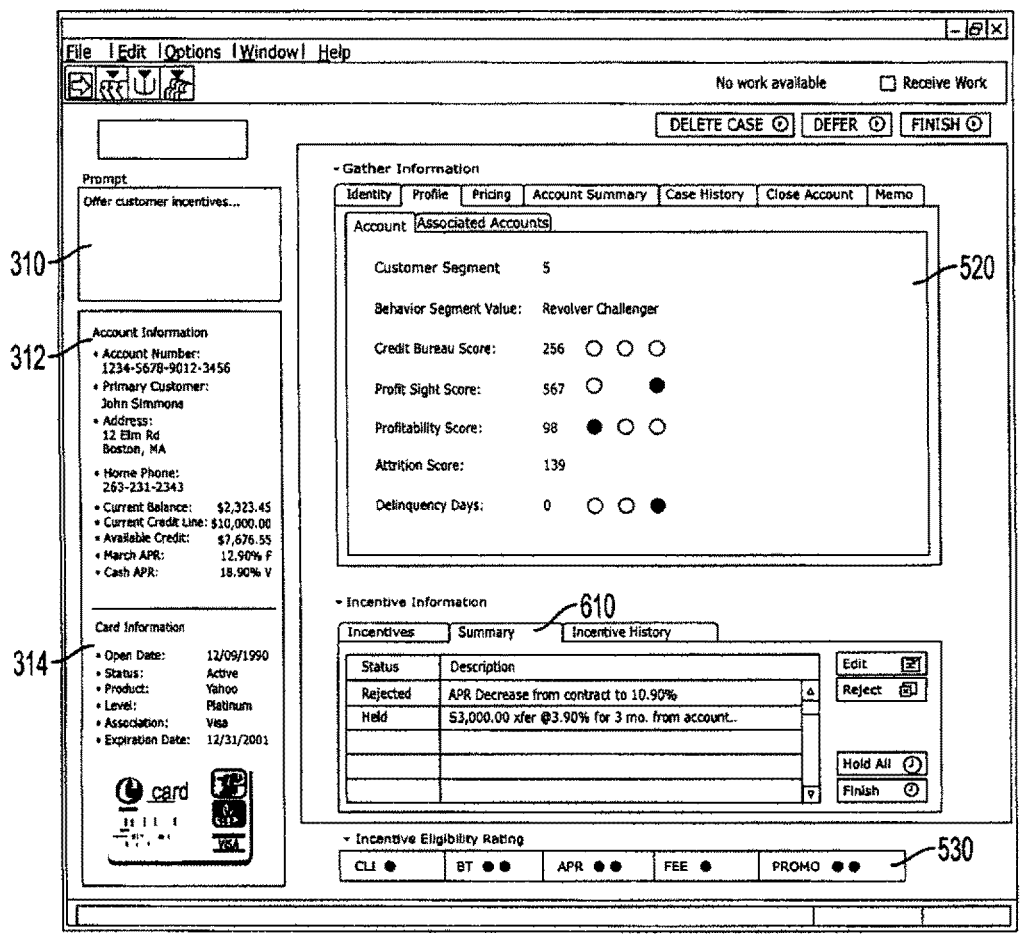
FIG. 6 illustrates an example of a GUI containing incentive summary information in accordance with an embodiment of the invention.
Figure 7:
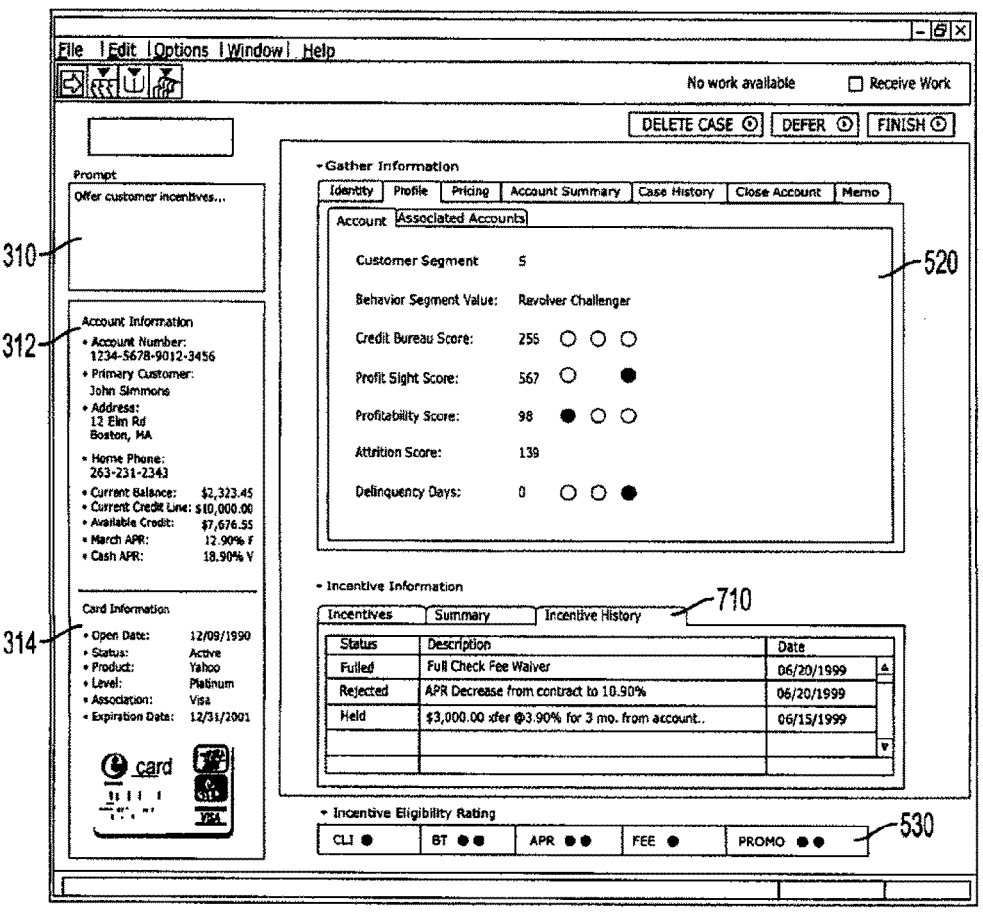
FIG. 7 illustrates an example of a GUI containing incentive history information in accordance with an embodiment of the invention.

Other incentive information may also be utilized by the provider representative, as illustrated by FIG. 6 and FIG. 7. Summary Tab 610 may display a description of incentives and the status of each incentive. Incentive Tab 710 may display the status, description and date of each incentive presented to the customer. This enables the provider representative to assess the success and failures of previous presentments of similar or related incentives. Thus, this historical information may assist the provider representative in selecting an appropriate incentive to the customer.

Referring to step 218, one or more incentive may be offered to the customer. Any additional calculations may also be performed (e.g., CLI amount). The customer may respond by accepting, rejecting, or placing the action on hold. Other responses are possible. If the customer accepts the incentive, at step 220, a provider representative may review the selected one or more incentives with the customer, at step 224. At this step, the accepted incentives are discussed with the customer for understanding and clarification. This discussion also provides the customer with the ability to make further changes or deletions. A fulfillment process at step 226 may also be performed. This process may involve sending information to a mainframe to fulfill the accepted incentive. A confirmation letter and other information may also be sent to the customer. However, if the customer rejects the incentives, the provider representative may offer alternative opportunities, at step 222. This process may be repeated as needed or until the customer decides to terminate the call or until the provider representative determines that it is no longer profitable to retain the customer. Also, the customer may place one or more offers on hold and return after further consideration. For example, the customer may want to discuss the one or more offers with family member, business partners, etc. Also, the customer may want to shop around for better incentives.

Figure 8:
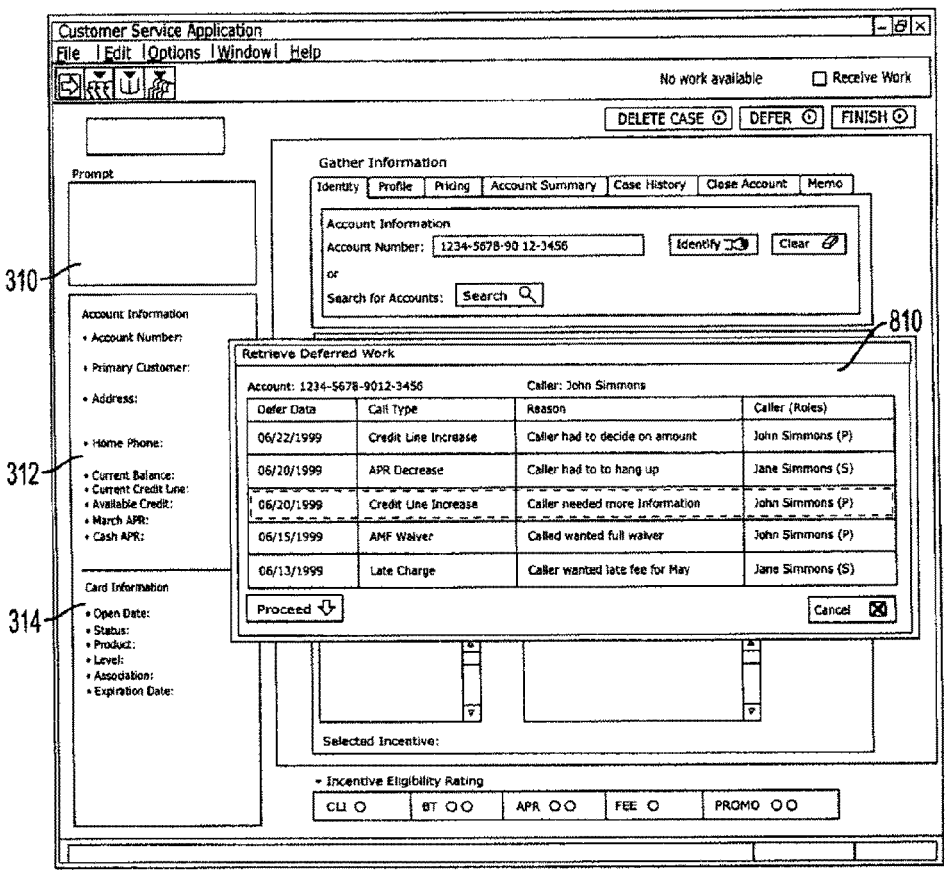
FIG. 8 illustrates an example of a GUI containing deferred work retrieval information in accordance with an embodiment of the invention.

According to another embodiment of the present invention, deferred work may be retrieved by a provider representative, as shown by FIG. 8. Deferred Work box 810 displays a list of calls that have been identified as deferred. The defer date, call type, reason, caller and other information may be displayed. When a deferred work is selected, the account may be retrieved and operations may be resumed.

Other embodiments and uses of this invention will be apparent to those having ordinary skill in the art upon consideration of the specification and practice of the invention disclosed herein. The specification and examples given should be considered exemplary only, and it is contemplated that the appended claims will cover any other such embodiments or modifications as fall within the scope of the invention. For example, for clarity, the invention is described in terms of a financial institution. It is to be understood, however, that the invention may also be utilized with a plurality of financial institutions or other product or service providers who each offer a plurality of products or services to customers through the system and method of the invention.

What is claimed is:

1. A computer implemented method for providing one or more tailored incentives to a customer, the computer implemented method comprising:

retrieving, by at least one processor, account data associated with the customer in response to a request from the customer;

identifying, by the at least one processor, from the request a request type from a list of predetermined request types wherein the request type identifies the customer's current situation;

identifying, by the at least one processor, the customer as a customer segment wherein the customer segment identifies the customer's past behavior;

identifying, by the at least one processor, one or more incentives for the customer based on the request type, the customer segment and one or more profitability factors associated with a financial institution providing the one or more incentives; and offering, by the at least one processor, the customer at least one of the identified one or more incentives, wherein the one or more incentives comprises at least one product or service offered by the financial institution, for retaining the customer in response to the request.

2. The method of claim 1, wherein the step of identifying the customer as a customer segment, further comprises the step of:

assigning a value to the customer based on at least one of customer payment history, customer payment habit, customer behavior data and credit bureau score.

3. The method of claim 1, wherein the step of identifying the customer as a customer segment, further comprises the step of:

considering information related to at least one of customer delinquency data and customer attrition data.

4. The method of claim 1, further comprising the step of:

offering the customer another one of the identified one or more incentives for retaining the customer in response to the request.

5. The method of claim 1, wherein the step of identifying one or more incentives further comprises the step of:

applying one or more restrictions on the one or more incentives based on the one or more profitability factors.

6. The method of claim 1, wherein the request comprises one or more of a telephone call and Internet communication.

7. The method of claim 1, wherein the one or more profitability factors comprise one or more of customer payment delinquency and customer ability to pay.

8. The method of claim 1, wherein the step of identifying the request further comprising the step of:

identifying a product associated with the customer, wherein the one or more incentives comprises an adjustment to the product.

9. The method of claim 1, wherein the request is a request to terminate a relationship with the financial institution and the customer.

10. The method of claim 1, wherein the at least one of the identified one or more incentives is provided to the customer via an electronic communication.

11. The method of claim 6, wherein the at least one of the identified one or more incentives is provided to the customer via an electronic communication.

12. A computer implemented system for providing one or more tailored incentives to a customer, the computer implemented system comprising:
- at least one processor configured to perform:
- retrieving account data associated with the customer in response to a request from the customer;
- identifying from the request a request type from a list of predetermined request types, wherein the request type identifies the customer's current situation;
- identifying the customer as a customer segment, wherein the customer segment identifies the customer's past behavior;
- identifying one or more incentives for the customer based on the request type, the customer segment and one or more profitability factors associated with a financial institution providing the one or more incentives; and
- offering at least one of the identified one or more incentives, wherein the one or more incentives comprises at least one product or service offered by the financial institution, for retaining the customer in response to the request.

13. The system of claim 12, wherein the customer is assigned a value based on at least one of customer payment history, customer payment habit, customer behavior data and credit bureau score.

14. The system of claim 12, wherein the customer segment considers information related to at least one of customer delinquency data and customer attrition data.

15. The system of claim 12, wherein the customer is offered another one of the identified one or more incentives for retaining the customer in response to the request.

16. The system of claim 12, wherein one or more restrictions is applied on the one or more incentives based on the one or more profitability factors.

17. The system of claim 12, wherein the request comprises one or more of a telephone call and Internet communication.

18. The system of claim 12, wherein the one or more profitability factors comprise one or more of customer payment delinquency and customer ability to pay.

19. The system of claim 12, wherein the request further identifies a product associated with the customer, wherein the one or more incentives comprises an adjustment to the product.

20. The system of claim 12, wherein the request is a request to terminate a relationship with the financial institution and the customer.

21. The system of claim 12, wherein the at least one of the identified one or more incentives is provided to the customer via an electronic communication.

22. The system of claim 17, wherein the at least one of the identified one or more incentives is provided to the customer via an electronic communication.

23. The method of claim 1, wherein the request type comprises one or more of: close account, request for re-price, request for competition offer and request for account consolidation.

24. The system of claim 12, wherein the request type comprises one or more of: close account, request for re-price, request for competition offer, and request for account consolidation.

* * * * *